United States Patent
Bonnell et al.

(10) Patent No.: US 7,183,921 B2
(45) Date of Patent: Feb. 27, 2007

(54) SYSTEM FOR TRACKING ITEMS

(75) Inventors: Clayton Bonnell, Fairfax, VA (US); Himesh A. Patel, Centereville, VA (US)

(73) Assignee: United States Postal Service, Washington, DC (US)

( * ) Notice: Subject to any disclaimer, the term of this patent is extended or adjusted under 35 U.S.C. 154(b) by 20 days.

(21) Appl. No.: 10/953,524

(22) Filed: Sep. 30, 2004

(65) Prior Publication Data
US 2005/0140511 A1 Jun. 30, 2005

Related U.S. Application Data

(60) Provisional application No. 60/532,565, filed on Dec. 29, 2003.

(51) Int. Cl.
G08B 13/14 (2006.01)
H01Q 7/00 (2006.01)
H01Q 13/10 (2006.01)
H01Q 1/52 (2006.01)
G06F 19/00 (2006.01)

(52) U.S. Cl. .............. 340/572.1; 340/572.3; 340/572.5; 340/572.7; 343/866; 343/841; 343/767; 235/385; 235/435

(58) Field of Classification Search ............ 340/572.1, 340/572.7, 572.5; 343/720, 764–767, 866, 343/841; 235/385, 435
See application file for complete search history.

(56) References Cited

U.S. PATENT DOCUMENTS 2,583,540 A * 1/1952 Bennett ................. 343/873
5,182,544 A * 1/1993 Aquilera et al. ......... 340/572.5
5,221,831 A * 6/1993 Geiszler .................. 235/440
5,305,002 A * 4/1994 Holodak et al. ........... 343/788
5,456,779 A * 10/1995 Sinha ..................... 156/91
5,458,162 A * 10/1995 Sinha ..................... 139/419
5,493,771 A * 2/1996 Sinha et al. ............... 29/600
5,666,259 A * 9/1997 Cooter et al. ............. 361/212

(Continued)

OTHER PUBLICATIONS

"Pentagon to Meet with Suppliers on RFID Plans," Computerworld, [on-line] http://www.computerworld.com/softwaretopics/erp/story/0,10801,87621,00.html, Dec. 2003.

(Continued)

*Primary Examiner*—Daniel Wu
*Assistant Examiner*—Lam Pham
(74) *Attorney, Agent, or Firm*—Finnegan, Henderson, Farabow, Garrett & Dunner, L.L.P.

(57) ABSTRACT

An item tracking system for tracking an item within a structure having at least one aperture through which the item is passed is provided. The item tracking system comprises a radio frequency tag attached to the item, a reader operably connected to a reader antenna, a processor operably connected to the reader, and a vertically suspended movable support for the reader antenna. The tag has item information stored therein and the reader is capable of reading the item information from the tag. The processor receives and stores the item information from the reader and the movable support is suspended from a location adjacent the top of the aperture. The support and reader antenna can move around the item to permit the item to pass through the aperture and the reader reads the item information from the tag when the item passes through the aperture using the reader antenna.

16 Claims, 3 Drawing Sheets

U.S. PATENT DOCUMENTS

| | | | | |
|---|---|---|---|---|
| 5,785,181 | A | | 7/1998 | Quartararo, Jr. ............ 209/3.3 |
| 5,822,714 | A | | 10/1998 | Cato ........................ 702/108 |
| 5,861,809 | A | * | 1/1999 | Eckstein et al. ......... 340/572.3 |
| 6,121,878 | A | | 9/2000 | Brady et al. ............. 340/572.1 |
| 6,318,636 | B1 | | 11/2001 | Reynolds et al. ...... 235/472.01 |
| 6,354,493 | B1 | | 3/2002 | Mon ......................... 235/380 |
| 6,377,203 | B1 | | 4/2002 | Doany ........................ 342/44 |
| 6,400,271 | B1 | * | 6/2002 | Davies et al. ............ 340/572.1 |
| 6,429,776 | B1 | | 8/2002 | Alicot et al. ............. 340/572.1 |
| 6,563,425 | B2 | | 5/2003 | Nicholson et al. ....... 340/572.1 |
| 6,943,688 | B2 | * | 9/2005 | Chung et al. ............ 340/572.7 |
| 2004/0004577 | A1 | * | 1/2004 | Forster ..................... 343/866 |
| 2004/0070503 | A1 | * | 4/2004 | Monahan ................ 340/572.7 |

OTHER PUBLICATIONS

"Sentinel RFID Antenna Systems Ultra-High/Microwave Frequency (900 MHz)," http://sentinelid.com/uhfantennas.html, printed Dec. 2, 2003.

"Product Data Sheet, MegaGates, 3m Plus Read, Antenna System for 13.56MHz RFid", printed Dec. 2003.

"Stationary Reader," Matrics, printed Feb. 2003.

"General Purpose Antenna," Matrics, printed Feb. 2003.

"Series 200 Antennas," Texas Instruments, Radio Frequency Identification Systems, 11-08-22-003, Mar. 2002.

"CommerceNet EPC Initiative," http://www.commerce.net/initiatives/cn-epc.html , printed Dec. 8, 2003.

"RFID, The Auto ID Center, EPCs, EPC Global Inc, and RSI ID Technologies; Demystifying the Alphabet Soup," RSI ID Technologies, Oct. 30, 2003.

"Welcome to EPCglobal," http://www.epcglobalinc.org, printed Dec. 8, 2003.

"RFID Connections—Oct. 2003," The AIM Global Network Standards, The Association for Automatic Identification and Data Capture Technologies, http://www.aimglobal.org/technologies/rfid/resources/articles/otc03/mandate.htm.

"RFID Users Differ On Standards," B. Brewin, Computerworld, Oct. 27, 2003, http://www.computerworld.com/mobiletopics/mobile/story/0,10801,86486,00.html?f=x68, printed Dec. 8, 2003.

"Frequently Asked Questions," EPCglobal, http://www.epcglobalinc.org/about/faqs.html.

"Walmart to Cast a Giant Shadow," InfoWorld, Oct. 30, 2003, http://weblog.infoworld.com/techwatch/archives/000113.html.

International Search Report for International for Application No. PCT/US04/32202, mailed Apr. 11, 2006.

* cited by examiner

SYSTEM FOR TRACKING ITEMS

RELATED APPLICATION

The present application is related to and claims priority of U.S. Provisional Application No. 60/532,565 filed on Dec. 29, 2003, in the name of CLAY BONNELL et al. and titled SYSTEM FOR TRACKING ITEMS, the contents of which are fully incorporated herein by reference.

DESCRIPTION OF THE INVENTION

Background of the Invention

This invention relates to a system that uses Radio Frequency Identification ("RFID") for tracking items during shipping and receiving.

RFID is conventionally known and refers to the process of storing and retrieving data from integrated circuits using radio frequency transmissions. The primary application of RFID technology is the ability to locate, identify, and track objects. There are three primary components to an RFID system; a transponder (or tag), an interrogator (or reader), and a computer (or processor). Additionally, each interrogator, or reader, has a reader antenna.

Transponders are often referred to as "tags" because they "tag" or identify the item they are attached to. A transponder comprises an Integrated Circuit ("IC") and a tag antenna. The IC stores data that is relevant to the item and sends it to an interrogator via the tag antenna. The data may include information such as where the item originated or the date of the item's production.

Interrogators are devices that activate or power the transponders and retrieve the data stored on the IC. These interrogators have antennas of their own—reader antennas—for sending and receiving radio signals.

In operation, the interrogator first directs radio waves to the transponder, effectively activating it. The transponder responds by returning the data stored on the IC to the interrogator. Once the data is collected by the interrogator, it is passed through an interface to a host computer. Using software, the computer can update stock levels, display the position of the item, alert when items are no longer available, and otherwise track the shipping history of the item.

Conventional RFID tag readers, however, have several drawbacks that make them impractical in certain shipping or industrial environments.

For example, many conventional tag readers are composed of a pair of vertical gates, which are positioned adjacent to one or both sides of a doorway, entryway, or aperture. In an industrial setting, such as near a dock door, forklifts and other heavy-duty equipment may damage these gates if accidentally collided with. Furthermore, use of metal bollards or other devices to protect the gates may have the adverse consequence of interfering with the radio frequency transmission of the RFID tag or reader.

Other types of conventional tag readers may lack the power and read range to adequately activate and read the RFID tag. Read range is the maximum distance a reader can effectively read a tag, which is often less than a few feet. As described above, the reader transmits a low-power radio signal, through its antenna, that the tag receives via its own antenna to power the IC. Read range depends on several factors, with the size of the transponder's antenna, the size of the reader's antenna, and reader's output power being the most important. Conventional readers and tags make it difficult to combine long read range, low power output, and small tags with one another.

For example, in some warehouses, the width of a docking door is approximately 8 feet, which may be too wide for some conventional readers to operate. If the tag reader is located adjacent to or completely above the entryway and the tag is located low to the ground or away from the reader, the tag may be out of the reader's read range. If the tag is not properly activated by the radio frequency transmission of the reader, the product information will not be retrieved.

Additionally, some industrial environments may have floors that make it impractical to install standard floor-mounted gate readers. If—for example—the floor contains concrete with asbestos, the safety measures taken to install the gates may make it prohibitively expensive. Further, the location of bollards may prohibit the installation of conventional gate-type readers. And even further, some metal dock levelers may encroach onto the optimal conventional gate installation area, thus requiring either the gates to be placed further apart or the reconfiguration of the current dock levelers. The presence of bollards or dock levelers may also interfere with the transmission of the radio frequency signals, as well.

The present invention overcomes many of the deficiencies found in conventional RFID readers, including those discussed above.

SUMMARY OF THE INVENTION

The invention is directed to an improved system that uses Radio Frequency Identification ("RFID") for tracking items during shipping and receiving.

According to one aspect of the invention, an item tracking system for tracking an item within a structure having at least one aperture through which the item is passed is provided. The item tracking system comprises a radio frequency tag attached to the item, a reader operably connected to a reader antenna, a processor operably connected to the reader, and a vertically suspended movable support for the reader antenna suspended from a location adjacent to the top of the aperture. The tag has item information stored therein and the reader is capable of reading the item information from the tag. Further, the processor receives and stores the item information from the reader. The support and reader antenna can move around the item to permit the item to pass through the aperture and the reader reads the item information from the tag when the item passes through the aperture using the reader antenna.

According to another aspect of the invention, the bottom end of the movable support contacts the ground.

According to yet another aspect of the invention, the movable housing includes a wire for dissipating static electricity.

According to yet another aspect of the invention, the movable support comprises a flexible plastic material.

According to yet another aspect of the invention, the flexible plastic material consists essentially of PVC.

According to yet another aspect of the invention, the movable housing comprises an elongated foam cylinder.

According to yet another aspect of the invention, the reader antenna is positioned near the bottom end of the movable support.

According to yet another aspect of the invention, the reader antenna is positioned about 18 inches from the bottom end of the movable support.

According to yet another aspect of the invention, the tag is a Radio Frequency Identification tag.

According to yet another aspect of the invention, the system further comprises a secondary reader antenna capable of reading the item information from the tag and the movable support holds the secondary reader antenna. Additionally, the secondary reader antenna provides a redundant backup to the reader antenna and the reader reads the item information from the tag when the item passes through the aperture using the secondary reader antenna.

According to yet another aspect of the invention, the secondary reader antenna is positioned vertically above the reader antenna in the movable support.

According to yet another aspect of the invention, the secondary reader antenna is positioned horizontally across from the reader antenna in the movable support.

According to yet another aspect of the invention, the reader antenna is imbedded in the movable support.

According to yet another aspect of the invention, the reader antenna is attached to the movable support with an adhesive.

According to yet another aspect of the invention, the movable support is translucent.

According to yet another aspect of the invention, the system further comprises a second radio frequency tag attached to a second item, a second entry reader antenna, and a second vertically suspended movable support for holding the second entry reader antenna. The second tag stores second item information and the reader is capable of reading the second item information from the second tag. The second support for the second antenna is suspended from a location adjacent the top of a second aperture and the second support and second antenna can move around the item to permit the item to pass through the second aperture. The reader is operably connected to the second antenna for reading the second item information, the processor receives and stores from the reader the second item information, and the reader reads the second item information from the second tag when the second item passes through the second aperture using the second antenna.

According to yet another aspect of the invention, the system further comprises a second reader operably connected to the processor.

The reader should understand that both the foregoing general description and the following detailed description are exemplary and explanatory only and are not restrictive of the invention.

BRIEF DESCRIPTION OF THE DRAWINGS

The accompanying drawings are incorporated in and constitute a part of this specification. The drawings illustrate exemplary embodiments and, together with the description, serve to explain some principles of the invention. In the drawings.

DESCRIPTION OF THE EMBODIMENTS

Reference will now be made in detail to the exemplary embodiments of the invention, examples of which are illustrated in the accompanying drawings. Wherever possible, the same reference numbers will be used throughout the drawings to refer to the same or like parts.

Figure 1:
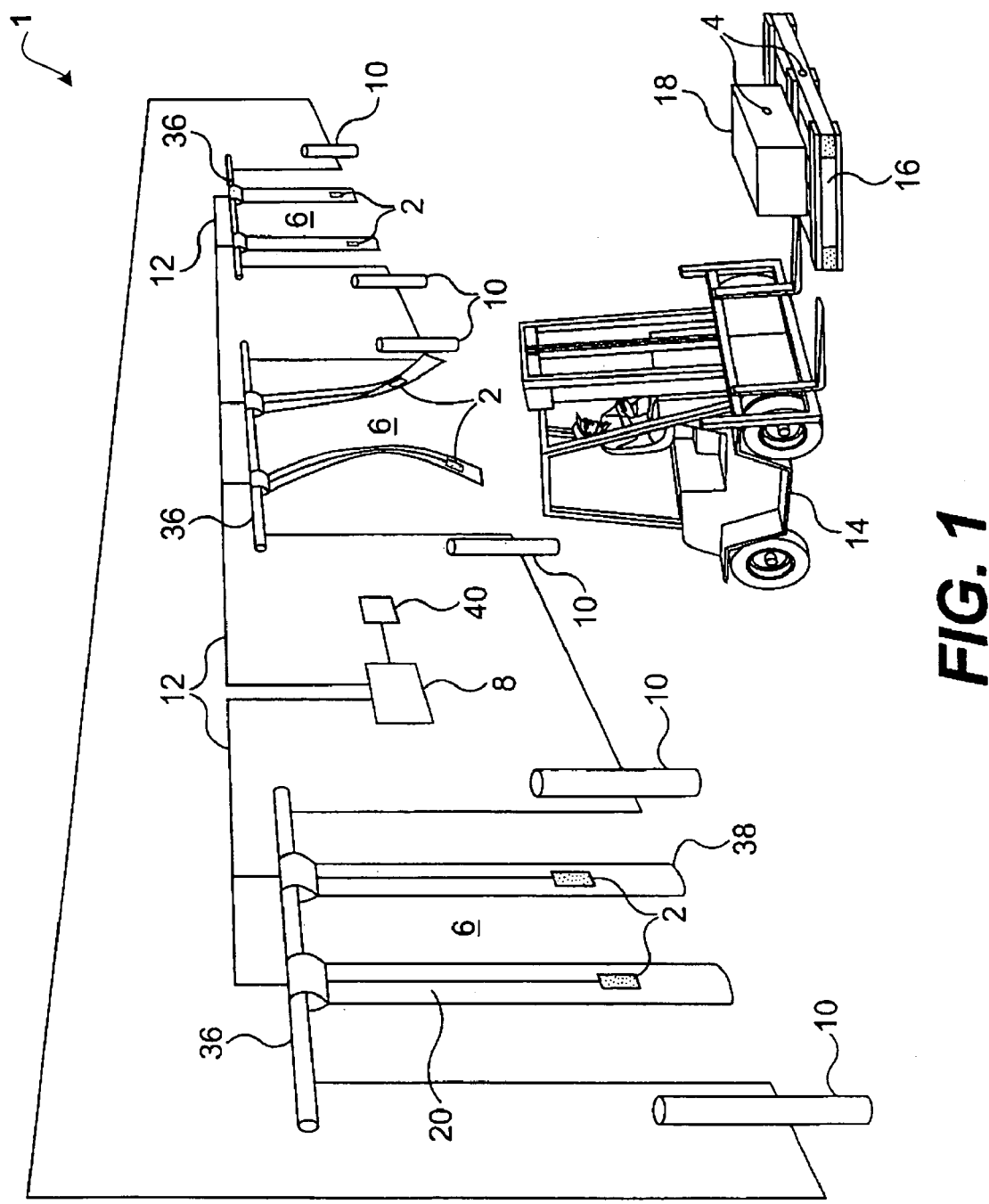
FIG. 1 shows a perspective view of an embodiment of the system according to the invention.
Figure 2:
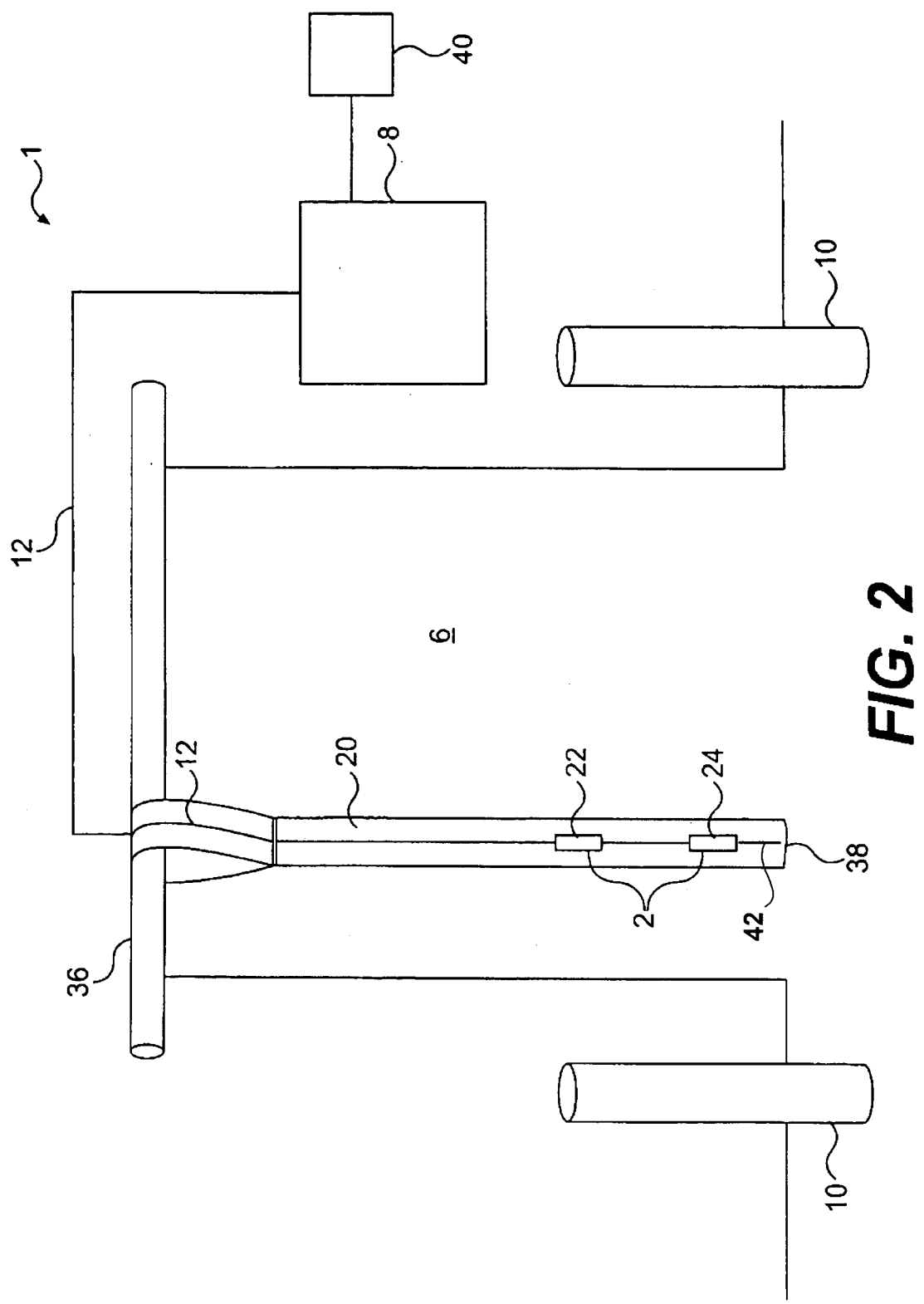
FIG. 2 shows a perspective view of an alternative embodiment of the system according to the invention.
Figure 3:
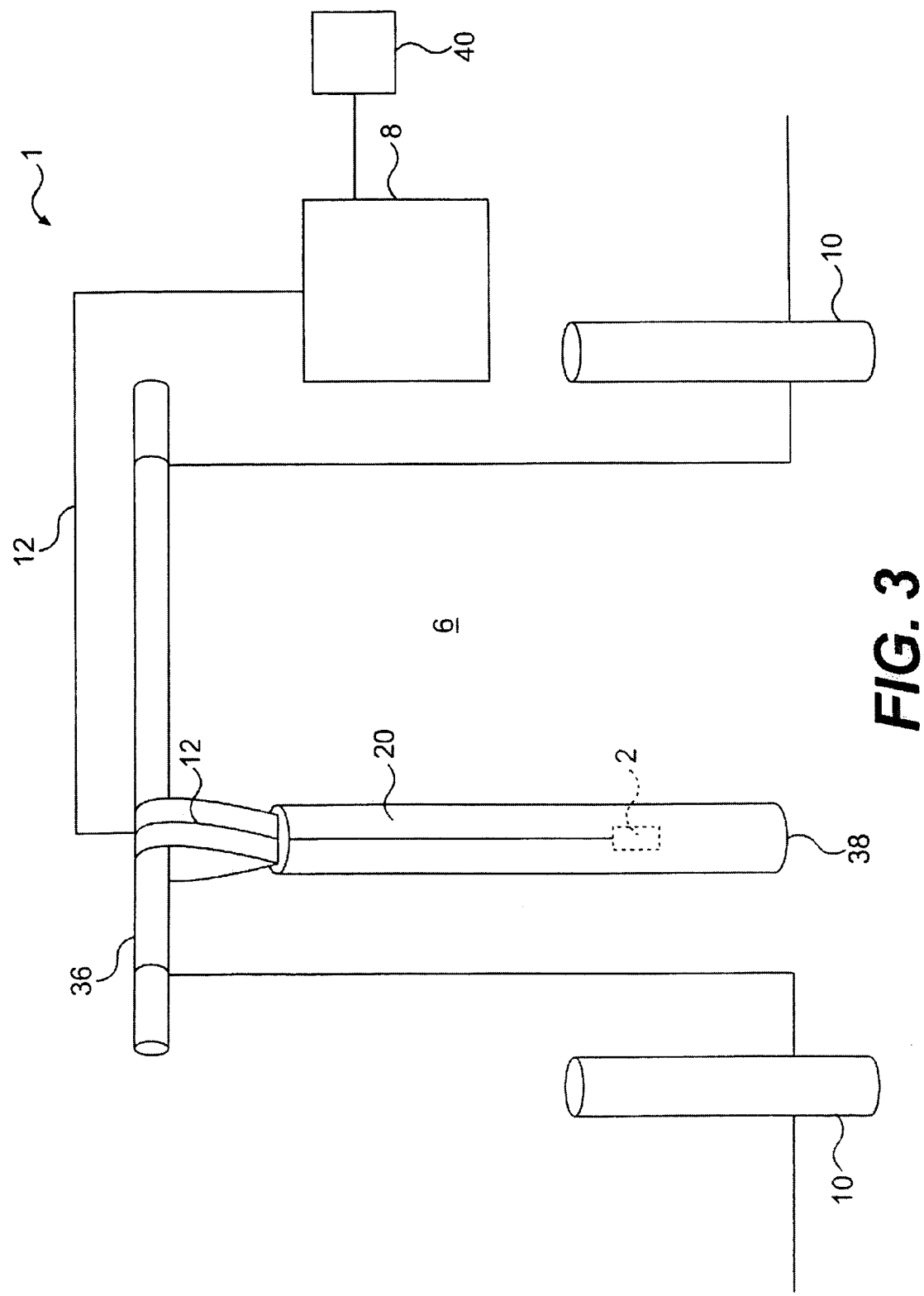
FIG. 3 shows a perspective view of a third embodiment of the system according to the invention.

In accordance with the invention, an item tracking system 1 for tracking an item (for example, a pallet 16 or carton 18) within a structure is depicted in FIGS. 1, 2, and 3. The system 1 is designed to track the shipping information of the item 16 or 18 using RFID tags 4, a reader antenna 2, a reader 8, and a processor 40. The system 1 may be implemented in a warehouse with bollards 10 and multiple docking bays or apertures 6.

In the particular embodiment shown in FIG. 1, the system 1 comprises a tag 4 attached to a carton 18 or pallet 16, at least one reader antenna 2, a reader 8, a processor 40, and a vertically suspended movable support 20 for holding the reader antenna 2. The tag 4 stores item information and the reader 8, which is operably connected to the reader antenna 2 via wires 12, is capable of reading the item information from the tag 4 via the antenna 2. The processor 40 is operably connected to the reader 8 for receiving and storing the item information, which may be later processed or retrieved, for example. Further, the movable support 20 is suspended from a location adjacent to the top 36 of the aperture 6 but otherwise freely hangs over the aperture 6. The support 20 and reader antenna 2 can move around the item 16 or 18 to permit the item 16 or 18 to pass through the aperture 6. Although the movable support 20 and reader antenna 2 may move, they may also remain stationary while the item 16 or 18 passes thru the aperture 6. The reader 8 reads the item information from the tag 4 when the item 16 or 18 passes thru via the reader antenna 2.

The reader antenna 2 may be attached to the moveable support 20 in any convenient manner. For example, the reader antenna 2 may be embedded in the movable support 20, or the reader antenna 20 may attached to the movable support with an adhesive.

Although the embodiments of FIGS. 1–3 depict the moveable support 20 attached to top portion 36 of the aperture 6 as a loop over a rod, any such configuration that provides both mechanical and electrical connection within the desired range of articulation can be used.

In an exemplary embodiment, the tag 4 is a RFID tag 4.

In the embodiment of FIG. 2, the bottom portion 38 of the movable support 20 contacts the ground when the movable support 20 is vertical. This design permits any possible electrostatic charge that is stored in the movable support 20 to dissipate to ground. Alternatively, the movable support 20 may comprise a wire 42 for dissipating the static electricity.

In an alternative embodiment, the movable support 20 may be a flexible plastic material.

The embodiments of FIGS. 1 and 2 illustrate using flexible plastic (e.g., PVC strips) as the movable support 20. Alternatively, the movable support 20 may comprise an elongated foam cylinder, as illustrated in FIG. 3. In another embodiment, the movable support 20 may be made of translucent material so that personnel can see through the support 20 for improved safety.

Furthermore, the embodiments of FIGS. 1, 2, and 3 position some of the reader antennas 2 near the bottom end 38 of the movable support 20 in order to minimize the necessary read range between the tag 4 and reader antennas 2. If the tags 4 are located on the pallet 16, a forklift 14 will only lift the pallet 16 off of the ground a few inches. As a result, the tag 4 will only be lifted a few inches from the ground. By locating the reader antennas 2 near the bottom end 38 of the movable support 20, the read distance between the tag 4 and reader antenna 2 is minimized, thus enhancing readability. In an exemplary embodiment, the reader antennas 2 are positioned about 18 inches from the bottom end 38.

In some instances, it may be desirable to stack pallets 16 upon one another. If each pallet 16 is associated with a unique tag 4, the location of the antennas 2 may need to be adjusted to enhance the readability of each tags 4. To improve upon the readability of the top pallet 16, an additional antenna 22 may be positioned vertically above antenna 24, as illustrated in FIG. 2.

The embodiments of FIGS. 2 and 3 also illustrate a system 1 that utilizes only one movable support 20 per aperture 6.

Furthermore, although the embodiment of FIG. 1 shows only three apertures 6, the system 1 operates with as few as one aperture 6 and as many as the processor 40 can accommodate.

Additionally, the particular embodiments of FIGS. 1 and 2 show two or four reader antennas 2 associated with each aperture 6. Although the system 1 may operate with only one reader antenna 2 per aperture 6—as depicted in FIG. 3—more antennas 2 may enhance operability while providing for redundancy in the event an antenna 2 is rendered inoperable or fails to read a tag 4. Furthermore, utilizing more than one antenna 2 per aperture 6 may permit the use of antennas 2 with shorter read ranges.

Further, the embodiment of FIG. 1 shows only one reader 8. Some readers 8, however, can only receive input from a limited number of reader antennas 2 (e.g., four antennas 2). Accordingly, if there are several apertures 6 that require several antennas 2, it may be necessary to use more than one reader 8 to receive the item information from the antennas 2. As such, multiple readers 8 may be used to accommodate this need, with each reader 8 providing a different input to the processor 40. Further, more than one processor 40 may be used if needed to store or process the item information.

It will be apparent to those skilled in the art that various modifications and variations can be made to the structure and methodology of the present invention without departing from the scope or spirit of the invention. Thus, it should be understood that the invention is not limited to the examples discussed in the specification. Rather, the present invention is intended to cover modifications and variations of this invention.

What is claimed is:

1. An item tracking system for tracking an item within a structure having an aperture defined by a bottom surface through which said item is passed, the item tracking system comprising:
   a radio frequency tag attached to the item, wherein the tag has item information stored therein;
   a reader operably connected to a reader antenna configured to read the item information from the tag;
   a processor operably connected to the reader for receiving and storing the item information from the reader; and
   a suspended movable support, supporting and suspending the reader antenna from a location adjacent a portion of the aperture,
   wherein:
      the support and reader antenna are movable around the item to permit the item to pass through the aperture,
      the reader reads the item information from the tag when the item passes through the aperture using the reader antenna, and
      a portion of the movable support contacts electrical ground at the bottom surface and is capable of dissipating static electricity to the electrical ground.

2. The item tracking system of claim 1, wherein the movable support includes a wire for dissipating static electricity.

3. The item tracking system of claim 1, wherein the movable support comprises a flexible plastic material.

4. The item tracking system of claim 3, wherein the flexible plastic material includes PVC.

5. The item tracking system of claim 1, wherein the movable support comprises an elongated foam cylinder.

6. The item tracking system of claim 1, wherein the reader antenna is positioned near an end portion of the movable support.

7. The item tracking system of claim 1, wherein the reader antenna is positioned about 18 inches from an end portion of the movable support.

8. The item tracking system of claim 1, wherein the tag is a Radio Frequency Identification tag.

9. The item tracking system of claim 1, further comprising a secondary reader antenna configured to read the item information from the tag, wherein the secondary reader antenna is attached to the movable support, wherein the reader reads the item information from the tag when the item passes through the aperture using the secondary reader antenna, and whereby the secondary reader antenna is redundant to the reader antenna.

10. The item tracking system of claim 9, wherein the secondary reader antenna is positioned vertically above the reader antenna in the movable support.

11. The item tracking system of claim 9, wherein the secondary reader antenna is positioned horizontally across from the reader antenna in the movable support.

12. The item tracking system of claim 1, wherein the reader antenna is imbedded in the movable support.

13. The item tracking system of claim 1, wherein the reader antenna is attached to the movable support with an adhesive.

14. The item tracking system of claim 1, wherein the movable support is translucent.

15. The item tracking system of claim 1, further comprising:
   a second radio frequency tag attached to a second item, wherein the second tag stores second item information;
   a second entry reader antenna configured to read the second item information from the second tag; and
   a second vertically suspended movable support for holding the second antenna, the second support for the second antenna being suspended from a location adjacent the top of a second aperture, wherein the second vertically suspended movable support and the second antenna can move around the item to permit the item to pass through the second aperture,
   wherein the reader is operably connected to the second antenna for reading the second item information,
   wherein the processor receives and stores from the reader the second item information, and
   wherein the reader reads the second item information from the second tag when the second item passes through the second aperture using the second antenna.

16. The item tracking system of claim 1, further comprising a second reader operably connected to the processor.

* * * * *